Jan. 15, 1952     W. A. BEDFORD, JR     2,582,580

SLEEVE MEMBER FOR KNOB ASSEMBLIES

Filed Aug. 29, 1949

INVENTOR:
WILLIAM A. BEDFORD JR.,
BY Philip E. Parker
ATTORNEY.

Patented Jan. 15, 1952

2,582,580

UNITED STATES PATENT OFFICE 2,582,580

SLEEVE MEMBER FOR KNOB ASSEMBLIES

William Augustus Bedford, Jr., North Scituate, Mass., assignor to United-Carr Fastener Corporation, Cambridge, Mass., a corporation of Massachusetts Application August 29, 1949, Serial No. 113,009

1 Claim. (Cl. 85—36)

This invention relates generally to fastening devices for attaching knobs to shafts, and has particular reference to a sheet metal sleeve member shaped and arranged to adapt a knob for assembly on a threaded shaft.

The object of the invention is to provide a knob fastener which is adapted for assembly in an opening in a knob to enable the knob to be pushed onto a threaded shaft for secure engagement therewith.

A further object of the invention is to provide a sheet metal fastener device for engaging a threaded shaft, which is adapted to be pushed onto the shaft for locking engagement therewith, but which can be removed from the shaft only by unscrewing the fastener from the shaft.

Other objects of the invention will, in part, be obvious, and will, in part, appear hereinafter. For a fuller understanding of the nature and objects of the invention, reference should be had to the following detailed description, taken in conjunction with the accompanying drawing, in which.

Figure 7:
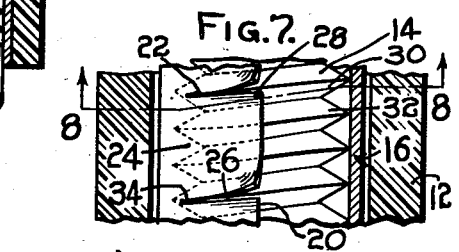
Fig. 7 is a section similar to Fig. 6 showing the tabs in elevation as the tabs engage the threaded shaft.

Referring to the drawing, there is illustrated a sheet metal fastening device 10, which is adapted for assembly in an opening in a knob 12 to enable the knob to be securely mounted on a threaded shaft 14. In the preferred form, the fastener 10 comprises a hollow sheet metal cylinder 16, having a longitudinal slot 18 extending from end to end of the cylinder, forming a longitudinal edge 20. A number of slits 22 are provided in the cylinder to extend inwardly from the edge 20 to form tongues 24, which are shaped and arranged to have an upper edge 26 which is substantially parallel to the threads of the shaft 14 when the shaft is inserted into the cylinder. In the preferred embodiment, this is accomplished by having the slits 22 disposed at an angle to a plane perpendicular to the axis of the cylinder, said angle being equal to the helix angle of the threads of the shaft 14, so that the slits 22 will extend along the helix line of the threads of the inserted bolt (see Fig. 7).

Figure 1:
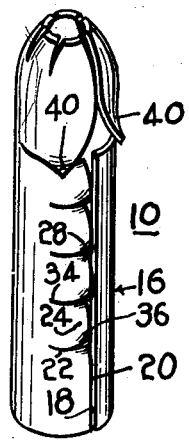
Fig. 1 is a perspective view of a preferred form of fastening device embodying the features of the invention.
Figure 2:
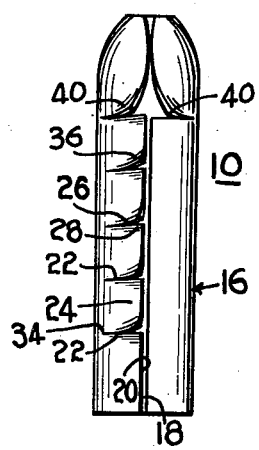
Fig. 2 is a view in elevation of the fastener of Fig. 1.
Figure 4:
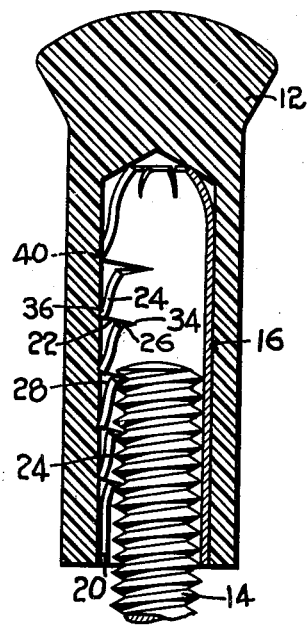
Fig. 4 is a view in elevation, partly in section, of the fastener device assembled in a knob.
Figure 3:
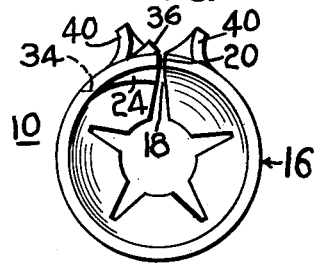
Fig. 3 is a bottom plan view of the fastener of Fig. 2.
Figure 6:
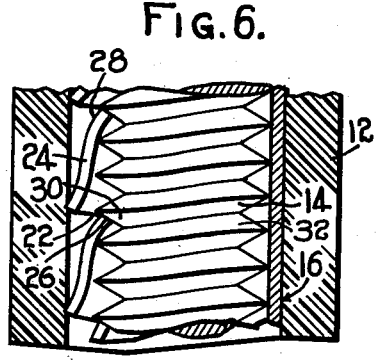
Fig. 6 is an enlarged view of a portion of the knob and shaft assembly illustrating the engaging action of the fastener with the threads of the shaft.
Figure 8:
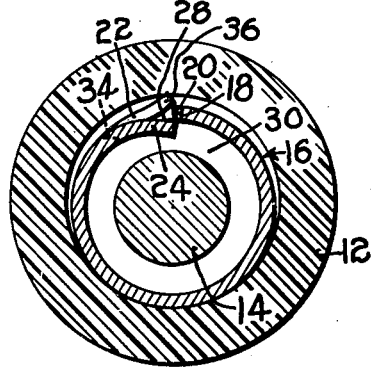
Fig. 8 is a view in section taken on line 8—8 of Fig. 7.

The upper corner 28 of each tongue 24 and the adjacent upper edge 26 is bent to extend inwardly and upwardly to engage the shaft 14 between adjacent threads. As illustrated in Figs. 4 and 6, the shape of the bent portion is such that only the upper portion of the edge 20 of the tongue is bent inwardly, so that the corner 28 may project a substantial distance into the space between adjacent threads 30 and 32 without substantial frictional engagement with the crest of the thread 32. However, the shape of the bent portion of the tongue is such that the upper edge 26 of the tongue is deformed inwardly to some extent throughout a substantial portion of its length, with the greatest amount of inward deformation occurring at the corner 28, and the amount of deformation decreasing gradually toward the juncture 34 of the upper edge of the tongue with the main body of the cylinder. (See Fig. 3.) By this means the upper edge 26 of each tongue contacts the face of the adjacent upper thread along a continuous line, extending from the crest of the thread at the juncture 34 to the root of the thread at the corner 28, to provide a secure engagement between the fastener and the threaded shaft (see Fig. 8). In the preferred form, the upper edge of the tongues are deformed inwardly at an angle less than 90 degrees to the axis of the cylinder so that during insertion of a threaded shaft the inwardly bent upper edge will spring outwardly to allow the shaft to pass into the cylinder, and will engage the shaft between adjacent threads as hereinbefore described to prevent removal of the shaft from the cylinder by a direct pull (see Fig. 4).

Figure 5:
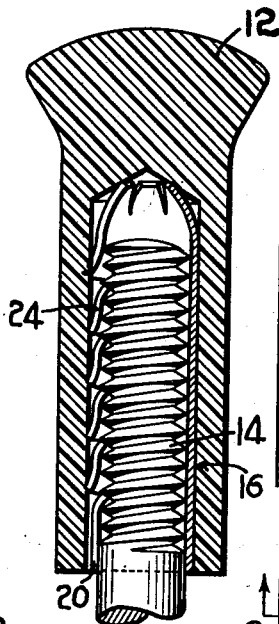
Fig. 5 is a view in elevation, partly in section, of the knob and fastener assembly mounted on a threaded shaft.

To provide means for engagement with the knob 12, the lower corner 36 and the adjacent portion of the lower edge may be bent outwardly in a manner similar to that in which the upper edge is bent inwardly so that the fastener 10 may be easily inserted into the opening in the knob 12 which causes inward flexing of the corner 36, but cannot be removed therefrom, since the lower corners 36 dig into engagement with the wall of the opening (see Figs. 4 and 5). Since the size of the fasteners and the openings in which they are to be assembled are subject to a certain amount of variation, occasionally a fastener may not engage the knob securely until the shaft 14 is assembled therein to expand the fastener outwardly against the wall of the opening. To insure that the fastener will be retained securely in the knob until assembled on a shaft, a pair of pointed prongs 40 may be provided on the upper portion of the cylinder. The prongs 40 extend downwardly and outwardly from the cylinder to engage the wall of the opening in the same general manner as the lower corners 36 of the tongues 24, but the prongs 40 extend considerably further outwardly than the corners 36 to insure that the fastener will be retained in the opening whether or not the lower corners 36 of the tongues engage the knob.

The fastener 10 may be easily assembled in the knob by merely inserting the upper end of the cylinder 16 into the opening in the knob and forcing the cylinder into the opening so that the prongs 40 and lower corners 36 of the tongues 24 bite into the wall of the opening to retain the fastener assembled therein. The knob having the fastener assembled therein may be mounted on a threaded shaft 14 by simply placing the knob on the shaft so that the shaft enters the opening in the lower end of the cylinder, and forcing the knob onto the shaft by a pushing action, which causes the tongues 24 to engage the threads as hereinbefore described.

Although the knob cannot be disengaged from the shaft by a direct pull, it may easily be removed by rotating the knob on the shaft in the proper direction to unscrew the tongues from the threads. Since the upper edge of each tongue is shaped and arranged to engage the threads on a line contact rather than at a point, the knob may be assembled on and removed from the shaft a great number of times without damage to the threads.

The sleeve member may be readily and economically produced by automatic machines using relatively inexpensive dies, and the features of the fastener greatly reduce the time required to assemble the component parts of the knob assembly, thereby reducing the cost of the completed assembly.

Although the sleeve member is intended primarily for use on threaded shafts, in some cases it may also be used satisfactorily on smooth shafts. The knob may be made of any suitable material capable of the deformation required to allow the prongs on the sleeve to dig into engagement therewith, such as wood, plastic, or molded fibrous material.

Since certain obvious modifications may be made in the sleeve member without departing from the scope of the invention, it is intended that all matter contained herein be interpreted in an illustrative, and not in a limiting sense.

I claim:

A fastening device for assembly in an opening in a knob to receive a threaded shaft, said device comprising a hollow sheet metal cylinder open at the lower end thereof to receive a threaded shaft and having a longitudinal slot therein, extending from end to end to provide opposed adjacent edges, a plurality of tongues formed along one of said edges by slits extending inwardly from said one edge, the upper edge of each of said tongues being bent inwardly toward the axis of said metal cylinder to engage an inserted shaft between adjacent threads, the amount of inward bending of said upper edge being greatest at the upper free corner and decreasing gradually toward the point where the tongue joins the cylinder, the lower edge of each of said tongues being bent outwardly to engage the wall of the opening in the knob when the cylinder is inserted therein, the amount of outward bending of the lower edge being greatest at the lower free corner and decreasing gradually toward the point where the tongue joins the cylinder, and a pair of prongs adjacent the upper end of said cylinder on opposite sides of the slot extending downwardly and outwardly from the cylinder in the same general manner as the lower edges of the tongues but to a somewhat greater extent, said prongs being adapted to engage the wall of an opening in a knob to retain the metal cylinder therein pending insertion of a threaded shaft.

WILLIAM AUGUSTUS BEDFORD, Jr.

REFERENCES CITED

The following references are of record in the file of this patent:

UNITED STATES PATENTS

| Number | Name | Date |
|---|---|---|
| 665,536 | Loffelhardt | Jan. 8, 1901 |
| 942,693 | Wintermute | Dec. 7, 1909 |
| 1,095,366 | Abbott | May 5, 1914 |
| 2,314,770 | Cogswell | Mar. 23, 1943 |